United States Patent [19]

Holt et al.

[11] 4,011,638

[45] Mar. 15, 1977

[54] JOINT CLAMP FOR JOINING INTERSECTING BRACE MEMBERS AND METHOD FOR MAKING SAME

[75] Inventors: Jack A. Holt, Belmont; Philip A. Torbet, San Mateo, both of Calif.

[73] Assignee: The Burke Company, San Mateo, Calif.

[22] Filed: Dec. 18, 1975

[21] Appl. No.: 642,180

[52] U.S. Cl. .................. 403/171; 403/394
[51] Int. Cl.² .................. A44B 21/00; B25G 3/36
[58] Field of Search ......... 403/385, 395, 394, 397, 403/400; 24/81 CR, 243 S, 243 CR; 43/25.2

[56] References Cited

UNITED STATES PATENTS

| | | | |
|---|---|---|---|
| 2,933,335 | 4/1960 | Watts | 403/394 |
| 3,017,205 | 1/1962 | Williams | 403/397 |
| 3,067,537 | 12/1962 | Gregory et al. | 43/25.2 |
| 3,325,227 | 6/1967 | Hunter | 403/395 |

FOREIGN PATENTS OR APPLICATIONS

| | | | |
|---|---|---|---|
| 201,344 | 2/1956 | Australia | 403/400 |
| 370,197 | 4/1932 | United Kingdom | 403/397 |
| 423,146 | 1/1935 | United Kingdom | 403/385 |

*Primary Examiner*—Paul R. Gilliam
*Assistant Examiner*—A. M. Calvert
*Attorney, Agent, or Firm*—Naylor, Neal & Uilkema

[57] ABSTRACT

A joint clamp particularly useful in joining braces of the type used temporarily to brace concrete slabs employed in tilt-up construction. The clamp can be installed onto a cylindrical brace without the employment of tools and without access to either end of the brace. It comprises, as a principal component, a tubular member that defines an opening having a generally cylindrical cross-section corresponding to the cross-sectional size of the brace. The wall forming the cylindrical opening is formed with a helically extending slot having a width, in an oblique direction, slightly larger than the cylindrical brace so that the clamp can be placed on the brace in an oblique position and then twisted into parallelism with the brace to snugly embrace the brace. The tubular member carries one or more secondary clamps for securing cooperating secondary brace members thereto.

5 Claims, 5 Drawing Figures

JOINT CLAMP FOR JOINING INTERSECTING BRACE MEMBERS AND METHOD FOR MAKING SAME

BACKGROUND OF THE INVENTION

This invention relates to a joint clamp for use in securing braces of the type typically installed in mutually perpendicular relation to one another to temporarily support concrete slabs.

A patentability search was conducted, and the following U.S. Pat. Nos., none of which afford the salutary advantage achieved by the present invention, were cited: 499,568; 2,233,458; 2,389,751; 2,942,898; 3,157,001, and 3,617,076.

SUMMARY OF THE INVENTION

The present invention finds particular utility in securing temporary braces employed to support concrete slabs in a vertical position during construction of a building. In order for the completed building walls to be plumb and level, it is essential that the slabs be supported in such position. It is further important that the braces be capable of rapid installation and removal.

Tilt-up slabs of the type with which the present invention is concerned are typically supported by the combination of a tilt-up brace, knee brace and lace brace. The tilt-up brace extends from an upper region of the slab down to the ground in a sloped orientation and is generally of tubular telescoping construction to afford versatility and to assist in plumbing the slabs. The knee brace is fixed to a lower region of the slab and intersects and is joined to the tilt-up brace. The knee brace affords further support, both to the slab and to the tilt-up brace. The lace brace is installed horizontally along a plurality of slabs and assists in aligning the slabs relative to one another in a planar, plumb position. The present invention provides a joint clamp for quickly and adjustably securing the three braces to one another at their point of mutual intersection.

An object of the invention is to provide a clamp of the type referred to above that can be quickly installed without employing special tools. This object is achieved by providing a clamp with a tubular main body member in the form of a generally cylindric wall having an inner diameter corresponding to the outer diameter of the tilt-up brace. The cylindric wall has a helical slot therein, the slot having a width, in a direction oblique of the axis of the opening therethrough, equal to or slightly greater than the outer diameter of the tilt-up brace. Placement of the clamp onto the tilt-up brace in the oblique position relative thereto and rotation of the clamp into parallelism with the brace moves the body member into a position snugly embracing the brace. The exterior surface of the body member carries suitably positioned secondary clamps of conventional form for effecting attachment of the knee and lace braces to the member.

A feature and advantage of the main body described above is that it will remain in place on a tilt-up brace without attention during installation of the knee and lace braces. Accordingly, the braces can be installed and adjusted, with ease, by one workman.

Another object is to provide a joint clamp of the type referred to above that affords adjustment lengthwise with respect to all three of the braces. With respect to the tilt-up brace, the main body member can be slid longitudinally of such brace until it is suitably positioned. Because the main body member is made of steel or like material having some degree of elasticity, it will remain in place once it is correctly positioned. Adjustment of the knee and lace braces is provided by the secondary clamps on the exterior of the main body member.

Yet another object of the present invention is to afford secure clamping notwithstanding that the braces may be slightly displaced from a truly mutually perpendicular orientation. This object is achieved by providing, in the wall of the tubular main body member, a set screw which, when tightened, retards or eliminates axial movement of the member longitudinal of the main brace.

Still another object is to provide a method for forming a joint clamp of the type referred to above, which method affords establishment of all critical dimensions on flat stock, after which the appropriately shaped flat stock is rolled into a cylindrical configuration.

The foregoing, together with other objects, features and advantages, will be more apparent after referring to the following specification and the accompanying drawing.

DESCRIPTION OF THE PREFERRED EMBODIMENT

Figure 1:
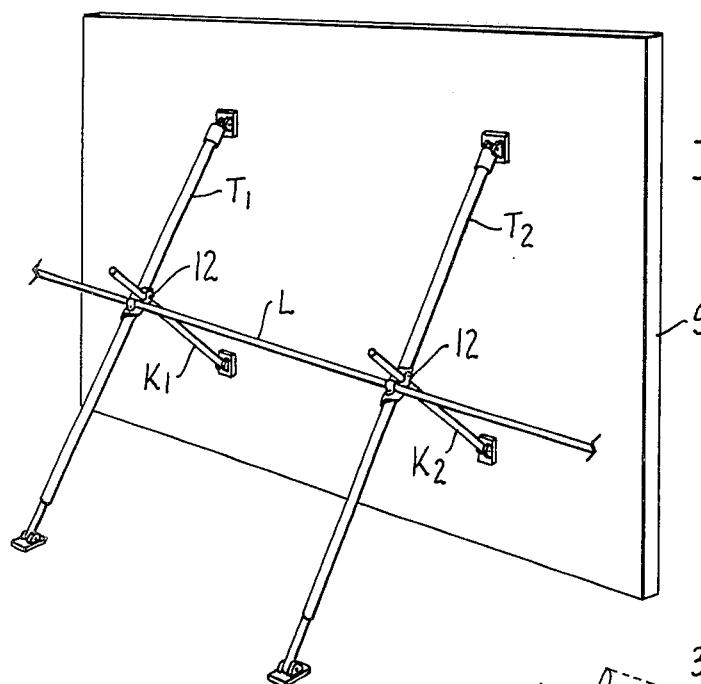
FIG. 1 is a perspective view of a concrete slab braced into a substantially vertical position and employing the joint clamp of the invention.
Figure 2:
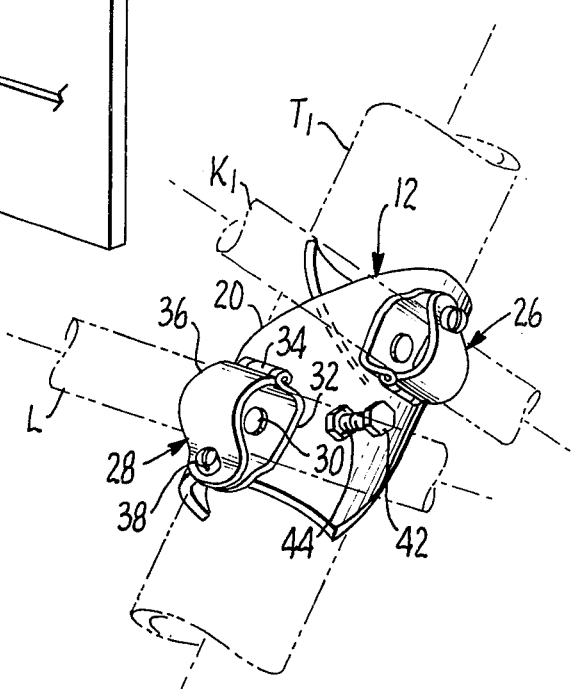
FIG. 2 is a perspective view of the joint clamp of the invention at greatly enlarged scale and with the cooperating braces shown in phantom lines.

Referring more particularly to the drawing, the invention is shown in an environment that includes a concrete slab S which is poured in a horizontal position and then tilted into a vertical position after curing. During fabrication, the slab is provided with anchors, in the form of screw sockets or the like of the type shown in U.S. Pat. No. 3,590,538, to facilitate attachment of tilt-up braces, two of which are identified as $T_1$ and $T_2$ in FIG. 1. There are also such screw sockets for securing the ends of knee braces to the lower portion of the slab, two such knee braces being identified by $K_1$ and $K_2$ in FIG. 1. Finally, the slab S and those supported in alignment with it are maintained in such alignment by a lace brace L. As seen in FIG. 1, tilt-up brace $T_1$, knee brace $K_1$ and lace brace L intersect at a common point and are generally mutually perpendicular to one another. A joint clamp 12, embodying the invention, is provided for securing the braces to one another to support temporarily slab S in the desired position.

Figure 3:
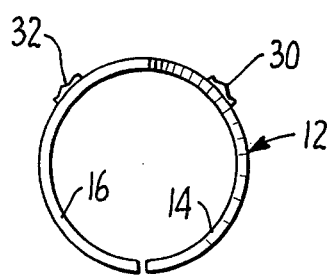
FIG. 3 is an axial end view of the tubular body member of the clamp of the invention.
Figure 4:
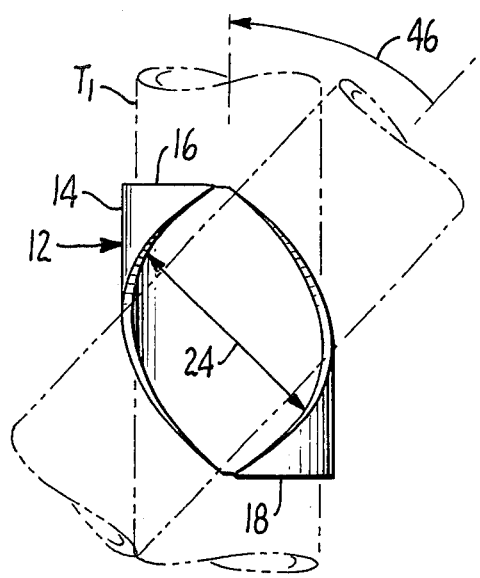
FIG. 4 is a front elevation view of the tubular body member of the invention.

As indicated in FIG. 3, joint clamp 12 includes a tubular main body member 14 that defines a cylindrical opening having a diameter equal to or slightly less than the outer diameter of cylindric tilt-up braces $T_1$ and $T_2$. Referring to FIG. 4, the upper end of the member 14 defines a semicircular end opening 16, and the lower end of the member defines a semicircular end opening 18. As indicated most clearly in FIG. 5, openings 16 and 18 are displaced from one another by 180°. Extending between opposite ends of semicircular openings 16 and 18 is a helical slot bounded by helically configured edges 20 and 22.

As can be seen in FIG. 4, the helical slot has a width in an oblique direction equal to, or greater than, the outer diameter of tilt-up brace $T_1$. The degree of obliqueness of the maximum width of the slot, indicated by arrow 24, is equal to, or less than, about 45° with respect to the longitudinal axis of the cylindric opening through the body member.

In the preferred embodiment, the axial extent of body member 14 is not greater, and preferably somewhat less, than one-half the circumference of the diameter of tilt-up brace $T_1$. This dimensional relationship affords engagement between the coupling and the brace by relative rotation therebetween. Stated otherwise, the pitch of helical edges 20 and 22 and the slot defined therebetween is no greater than one full revolution per unit of axial length of the body member equal to the circumference of brace $T_1$. Thus, the helical slot makes no more than one-half convolution around the body member and opens through the ends of the body member to define semicircular end segments spaced from one another relative to the longitudinal axis of the body member by 180° or less. Because the helical edges extend throughout approximately 180°, it follows that the axial length of the member 14 is no greater than one-half the circumference of the tilt-up brace member $T_1$.

Secondary screw clamps 26 and 28 are mounted on the exterior surface of member 14 to accommodate, respectively, the knee brace $K_1$ and the lace brace L. The screw clamps are secured to the exterior surface of member 14 by means of studs 30. Because the screw clamps are substantially identical, a detailed description of clamp 28 can be considered exemplary of both clamps.

The screw clamp 28 includes a base member 32 which is rigidly secured to the tubular wall of the member 14 by one of the studs 30. Base member 32 is curved to receive the lace brace L. A hinge 34 pivotally secures a curved clamp member 36 to the base member and a screw 38 passes through an opening in the clamp member 36 and threads into a suitable opening in clamp base member 32. In use, the screw is disengaged from the threads in base member 32 to afford entry of a lace brace into the clamp 28; whereupon, the screw may be re-engaged and tightened to secure the clamp 38 to the lace brace.

Although the brace members $T_1$, $K_1$ and L are typically installed in a mutually perpendicular relationship, there are situations where a slight degree of obliqueness may exist between the respective brace members. For example, if the angle between knee brace $K_1$ and tilt-up brace $T_1$ is not exactly 90°, there will be a component of force on the joint clamp 12 axially of brace member $T_1$. For resisting this component of force, tubular wall of the member 14 defines a threaded opening 40 in which is threaded a set screw 42. A locking nut 44 can be provided so that, after tubular member 14 is properly positioned on brace member $T_1$, screw 42 can be tightened to frictionally engage the surface of the brace member, after which lock nut 44 can be tightened to retain the set screw 42 in place.

In operation, slab S is hoisted into place by suitable equipment (not shown) and the tilt-up braces $T_1$ and $T_2$ are installed to bring the slab into an approximate plumb or vertical position. Thereafter, joint clamps 12 are installed on the respective tilt-up braces by placing the members 14 obliquely of the tilt-up braces and rotating the members relative to the axis of the braces. Such rotation, typically through an angle indicated at 46 in FIG. 4, moves the members 14 into the position where they are in circumscribed aligned parallel relationship with the braces. The inner diameter of member 14 is preferably established so that the material of which the member is made is slightly stressed. Thereafter, the joint clamp is axially and rotatively positioned, as desired, and knee braces $K_1$ and $K_2$ and lace brace L are engaged in clamps 26 and 28. The clamp screws are tightened and set screw 42 can be tightened.

If, during performance of the foregoing installation steps, it is perceived that slab S has moved away from the desired position, adjustments of the parts of joint clamp 12 can be made to support the slab in the desired position. When the building is completed, the joint clamp 12 and the braces can be quickly removed by reversing the above-described procedure to remove all of the bracing parts for subsequent use.

Figure 5:
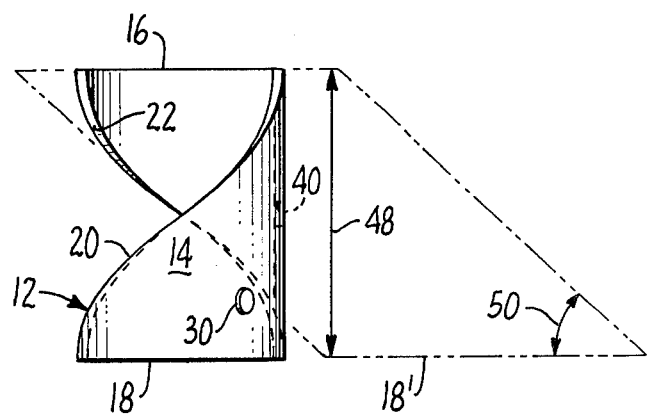
FIG. 5 is a side view to the tubular body member of the invention, the blank from which the tubular member is formed being superimposed thereon in phantom lines.

The present invention affords efficient and accurate fabrication of the member 14 to achieve the functions described above. Referring to FIG. 5, the member is laid out flat on a suitable sheet of material, such as 10-gauge cold rolled steel, in a parallelogram form. The use of such material results in the ultimate member 14 being substantially rigid. Preferably, two opposite sides of the parallelogram, one of which is indicated at 18', are laid out to a dimension equal to, or slightly less than, one-half the circumference of tilt-up brace member $T_1$. The perpendicular distance between such parallel lines, which is equal to the axial extent of the member 14 and identified in FIG. 5 by dimension line 48, is preferably established at a distance no greater than one-half the circumference. Because the dimension line 48 extends diagonally of the parallelogram, semicircular openings 16 and 18 will be displaced 180° from one another in the completed structure. Finally, the angle between two adjacent sides of the parallelogram, indicated at 50 in FIG. 5, is established at an angle preferably somewhat less than 45°, the precise angle depending on the dimension 48. Thereafter, the blank is rolled in a direction parallel to dimension 48 and into the cylindric form shown in FIG. 3.

Thus, it will be seen that the present invention provides a joint clamp that is relatively simple to fabricate and which materially expedites installation on the braces. The installation proceeds quite efficiently because the member 14 can be installed onto a tilt-up brace $T_1$ without the use of tools. When so installed, the brace retains its position because the inner diameter of the member 14 is slightly less than the outer diameter of the brace so that the material of which the member 14 is constructed is stressed during such installation. The amount of stress is relatively small however, so that the joint clamp can be axially and rotatively positioned for alignment with the knee and lace braces.

Although one embodiment of the invention has been shown and described, it will be obvious that other adaptations and modifications can be made without departing from the true spirit and scope of the invention. Accordingly, the invention is not intended to be limited to the specifics of that embodiment, but rather is defined by the accompanying claims.

What is claimed is:

1. An article of manufacture for joining first and second brace members to an elongate cylindric support, said article comprising a substantially rigid body including a wall defining an axially extending cylindric passage having a diameter corresponding substantially to the diameter of said cylindric support, said body having first and second axially spaced ends and a helical slot extending therearound and opening through said ends, said slot making no more than one-half convolution around said body and opening through said axially spaced ends to define simicircular end segments of the body spaced from one another relative the longitudinal axis of the body by 180° or less, said slot having a width greater than the diameter of said cylindric support so that said support may be passed through said slot and into said body and then rotated into a position in parallelism with the body wherein the wall of the body snugly embraces said cylindric support.

2. An article of manufacture, according to claim 1, wherein said body is formed of material having elasticity, said cylindric opening having a diameter less than the diameter of said cylindric support so that said body is stressed within the elastic limit of said material when said body snugly embraces said support so as to be retained axially of said cylindric support.

3. An article of manufacture, according to claim 1, including a first clamp member fixed to the exterior of said body, said clamp member including means for securing an elongate brace member therein to prevent movement of said brace member in a direction substantially perpendicular to said cylindric opening of said body.

4. An article of manufacture, according to claim 3, including a second clamp member fixed to the exterior of said body, said second clamp member including means for securing an elongate brace member thereto in perpendicular relationship to said cylindric opening and to a brace member secured in said first clamp member.

5. An article of manufacture, according to claim 1, including a threaded opening formed in said wall and extending generally radially of said cylindric opening, and a set screw threaded in said threaded opening for clamping said body against axial movement relative said cylindric support.

* * * * *